(12) United States Patent
Borkar

(10) Patent No.: US 10,798,212 B2
(45) Date of Patent: Oct. 6, 2020

(54) MESSAGE PROCESSING APPARATUS AND METHODS

(71) Applicant: MASTERCARD INTERNATIONAL INCORPORATED, Purchase, NY (US)

(72) Inventor: Vijaykumar Vamanrao Borkar, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 132 days.

(21) Appl. No.: 15/947,475

(22) Filed: Apr. 6, 2018

(65) Prior Publication Data

US 2018/0302493 A1 Oct. 18, 2018

(30) Foreign Application Priority Data

Apr. 12, 2017 (SG) .............................. 10201703028P

(51) Int. Cl.
*H04L 29/08* (2006.01)
*H04L 12/58* (2006.01)
*G06Q 40/02* (2012.01)

(52) U.S. Cl.
CPC .............. *H04L 67/32* (2013.01); *G06Q 40/02* (2013.01); *H04L 51/18* (2013.01); *H04L 67/2823* (2013.01); *H04L 67/2833* (2013.01)

(58) Field of Classification Search
CPC ................................ H04L 67/32; H04L 51/18
See application file for complete search history.

(56) References Cited

U.S. PATENT DOCUMENTS

| 7,146,399 B2 | 12/2006 | Fox et al. |
| 7,237,037 B2 | 6/2007 | Wells |
| 8,126,991 B2 | 2/2012 | Smith |
| 8,849,892 B2 | 9/2014 | Espino |
| 9,372,739 B2 | 6/2016 | Beardsmore |
| 2003/0101283 A1 | 5/2003 | Lewis |
| 2003/0120665 A1 | 6/2003 | Fox |

(Continued)

OTHER PUBLICATIONS

PCT International Search Report and Written Opinion, Application No. PCT/US2018/025023, dated Jul. 13, 2018, 10 pps.

*Primary Examiner* — Adnan M Mirza
(74) *Attorney, Agent, or Firm* — Armstrong Teasdale LLP

(57) ABSTRACT

An apparatus for processing messages is provided. The apparatus includes a computer processor and a data storage device, the data storage device having a message transform module and a message provision module including non-transitory instructions operative by the processor to receive a producer message from a message producer, the producer message being structured according to a producer message schema, the producer message schema defining a plurality of producer message fields, transform the producer message to obtain a subscriber message, wherein transforming the producer message includes applying a subscriber message transform including a set of rules for converting a message from the producer message schema to a subscriber message schema associated with a message subscriber, the subscriber message schema defining a plurality of subscriber message fields, and provide the subscriber message to the message subscriber.

19 Claims, 5 Drawing Sheets

(56) References Cited

U.S. PATENT DOCUMENTS

| | | | |
|---|---|---|---|
| 2003/0135556 A1 | 7/2003 | Holdsworth | |
| 2005/0213740 A1* | 9/2005 | Williams | H04M 3/436 |
| | | | 379/211.02 |
| 2005/0222933 A1* | 10/2005 | Wesby | G06Q 40/00 |
| | | | 705/36 R |
| 2006/0007466 A1 | 1/2006 | Ben Yehuda | |
| 2012/0059882 A1 | 3/2012 | Stark | |
| 2012/0246337 A1* | 9/2012 | Ross | H04L 45/308 |
| | | | 709/238 |

* cited by examiner

MESSAGE PROCESSING APPARATUS AND METHODS

CROSS REFERENCE TO RELATED APPLICATIONS

This patent application claims priority to Singapore Application No. 10201703028P filed on Apr. 12, 2017, the disclosure of which is incorporated by reference herein in its entirety as part of the present application.

BACKGROUND

The present disclosure relates to message processing and in particular to message broker methods and apparatus.

In computer middleware, messaging systems typically include a message broker that accepts messages on a designated queue from a producer transmits the messages to one or more interested parties called consumers or subscribers. The message broker may provide some way of authenticating the producer as well as subscriber(s). In some cases, the authorization may even play a part on deciding whether or not a message should be made available to the subscribers. However the message itself is transparent to the message broker. The subscriber gets exact message sent by the producer. Thus if different subscribers require or are allowed only part of the message, the producer must sent those parts to different queues on the message broker and subscriber must take those part-messages from respective queues. This results in the requirement for subscriber aware producers and limits the agility with which systems can be built.

BRIEF DESCRIPTION

In general terms, the present disclosure provides for message brokers to be aware of message structures or schemas and to filter or transform messages based on the authorization, interest or intent of the subscriber. This implementation frees up the message producer from having to generate different messages for different subscribers and allows for loose coupling between producer and subscriber.

A first aspect of the present disclosure provides an apparatus for processing messages. The apparatus includes a computer processor and a data storage device, the data storage device having a message transform module and a message provision module including non-transitory instructions operative by the processor to receive a producer message from a message producer, the producer message being structured according to a producer message schema, the producer message schema defining a plurality of producer message fields, transform the producer message to obtain a subscriber message, wherein transforming the producer message includes applying a subscriber message transform including a set of rules for converting a message from the producer message schema to a subscriber message schema associated with a message subscriber, the subscriber message schema defining a plurality of subscriber message fields, and provide the subscriber message to the message subscriber.

In an embodiment, the plurality of subscriber message fields defined by the subscriber message schema is a subset of the plurality of producer message fields defined by the producer message schema. The rules of the subscriber message transform may be determined according to a subscriber selection of message fields.

The subscriber message transform may include a rule based on a value of a field of the producer message.

The message transform module may further include non-transitory instructions operable by the processor to transform the producer message by applying a content filter to the producer message. The content filter may include a rule based on a value of a producer message field of the producer message.

In an embodiment, the content filter is configured according to an authorized message schema which defines a set of message fields which the subscriber is authorized to access.

The message provision module may further include non-transitory instructions operable by the processor to provide the subscriber message to the message subscriber by sending the subscriber message to the message subscriber or allowing the message subscriber to access the subscriber message.

In an embodiment, the data storage device further includes a message schema record module including non-transitory instructions operable by the processor to receive a producer message schema from the message producer and/or receive a subscriber message schema from the message subscriber, and store the subscriber message schema and/or the subscriber message schema in a schema repository.

In an embodiment, the data storage device further includes a subscriber message schema look-up module including non-transitory instructions operable by the processor to look up the subscriber message schema in a schema repository.

A second aspect of the present disclosure provides a method in a message broker server of processing a message. The method includes receiving a producer message from a message producer, the producer message being structured according to a producer message schema, the producer message schema defining a plurality of producer message fields, transforming the producer message to obtain a subscriber message, wherein transforming the producer message includes applying a subscriber message transform including a set of rules for converting a message from the producer message schema to a subscriber message schema associated with a message subscriber, the subscriber message schema defining a plurality of subscriber message fields, and providing the subscriber message to the message subscriber.

A further aspect of the present disclosure provides a non-transitory computer-readable medium. The computer-readable medium has stored thereon program instructions for causing at least one processor to perform operations of a method disclosed above.

BRIEF DESCRIPTION OF THE DRAWINGS

Embodiments of the disclosure will now be described for the sake of non-limiting example only, with reference to the following drawings in which.

DETAILED DESCRIPTION

Figure 1:
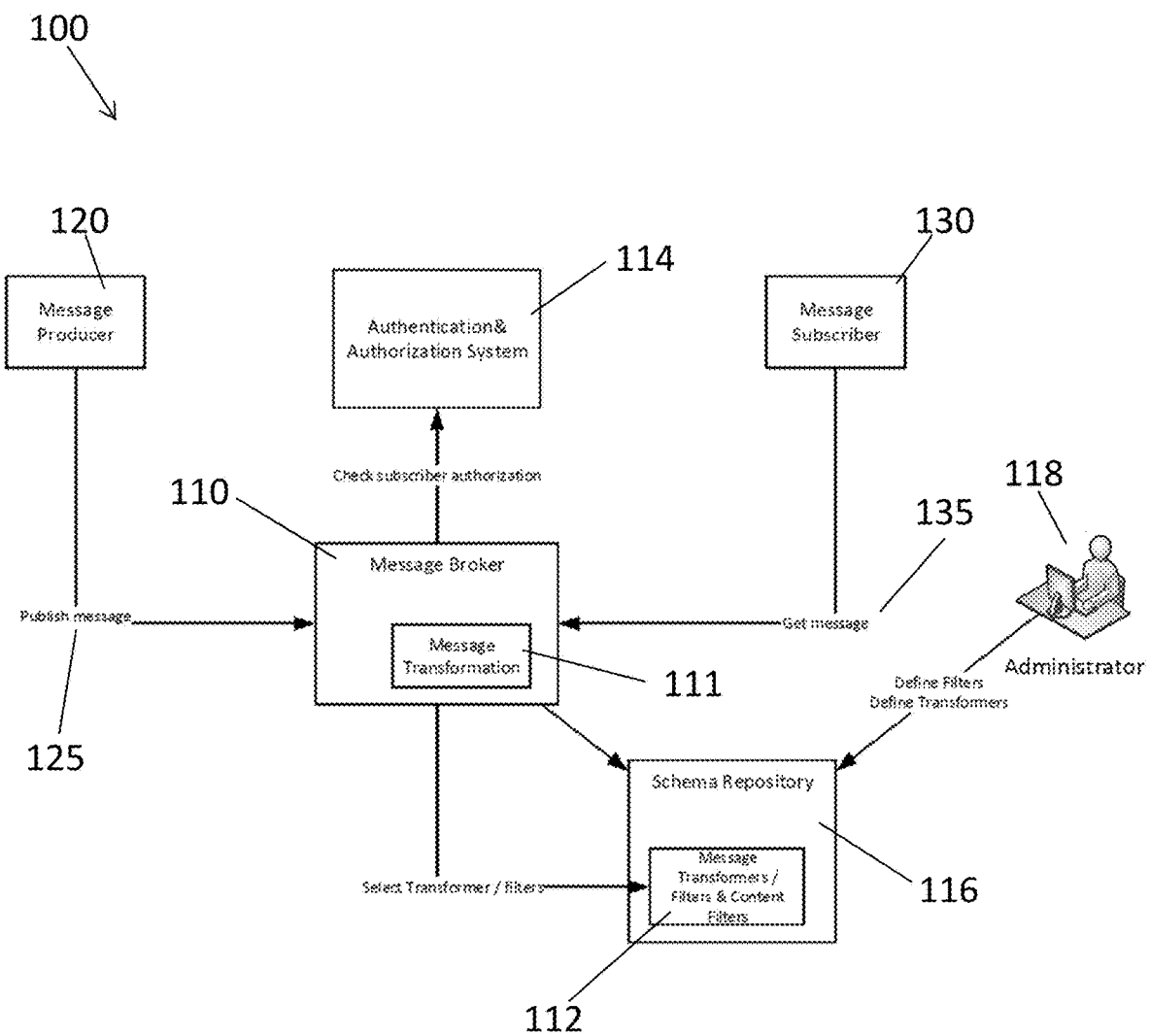
FIG. 1 is a block diagram showing a system for processing messages according to an embodiment of the present disclosure.

FIG. 1 is a block diagram showing a system for processing messages according to an embodiment of the present disclosure. The system 100 includes a message broker server 110. The message broker server 110 is coupled to a message producer terminal 120. The message producer terminal 120 is associated with an entity which generates information messages. The message producer terminal 120 publishes producer messages 125 which are received by the message broker server 110. The message broker server 110 is also coupled to a message subscriber terminal 130 associated with an individual or entity which wishes to receive information included in messages generated by the message producer terminal 120. The message subscriber terminal 130 is provided with subscriber messages 135 by the message broker server 110. The communication between the message broker server 110, the message producer terminal 120, and the message subscriber terminal 130 may take place via any type of network, for example, a virtual private network (VPN), the Internet, a local area and/or wide area network (LAN and/or WAN), and so on.

The message broker server 110 is coupled to a message authentication and authorization system 114, and a message schema repository 116 which stores message transformers and/or content filters 112.

The message broker server 110 includes a message transformation block 111 which transforms messages using message transformers or content filters. The message broker server 110 may select message transformers and/or filters from the schema repository 116 which stores message transformers and/or content filters 112. The message transformers and/or content filters 112 include rules for converting messages from a message producer schema associated with the message producer terminal 120 to a message subscriber schema associated with the message subscriber terminal 130.

The message authentication and authorization system 114 may be integrated into the message broker server 110 and may store indications of message fields which are authorized to be made available to the message subscriber terminal 130.

The schema repository 116 stores message producer schemas associated with message producers such as the message producer terminal 120 shown in FIG. 1. The schema repository 116 also stores message subscriber schema associated with message subscribers such as the message subscriber terminal 130 shown in FIG. 1. It is envisaged that embodiments of the present disclosure may be implemented with more than one message subscriber and more than one message producer. These message subscribers and/or message producers may have individual message schema stored in the schema repository 116. In some embodiments, multiple subscribers or multiple producers may share the same message schema.

In some embodiments, the message schemas are in the Extensible Markup Language (XML) format, or the JavaScript Object Notation (JSON) format. Those of skill in the art will appreciate that other formats for the message schemas could be used in embodiments of the present disclosure.

An administrator 118 may input and/or edit definitions of message filters and/or message transformers 112 stored in the schema repository 116.

Figure 2:
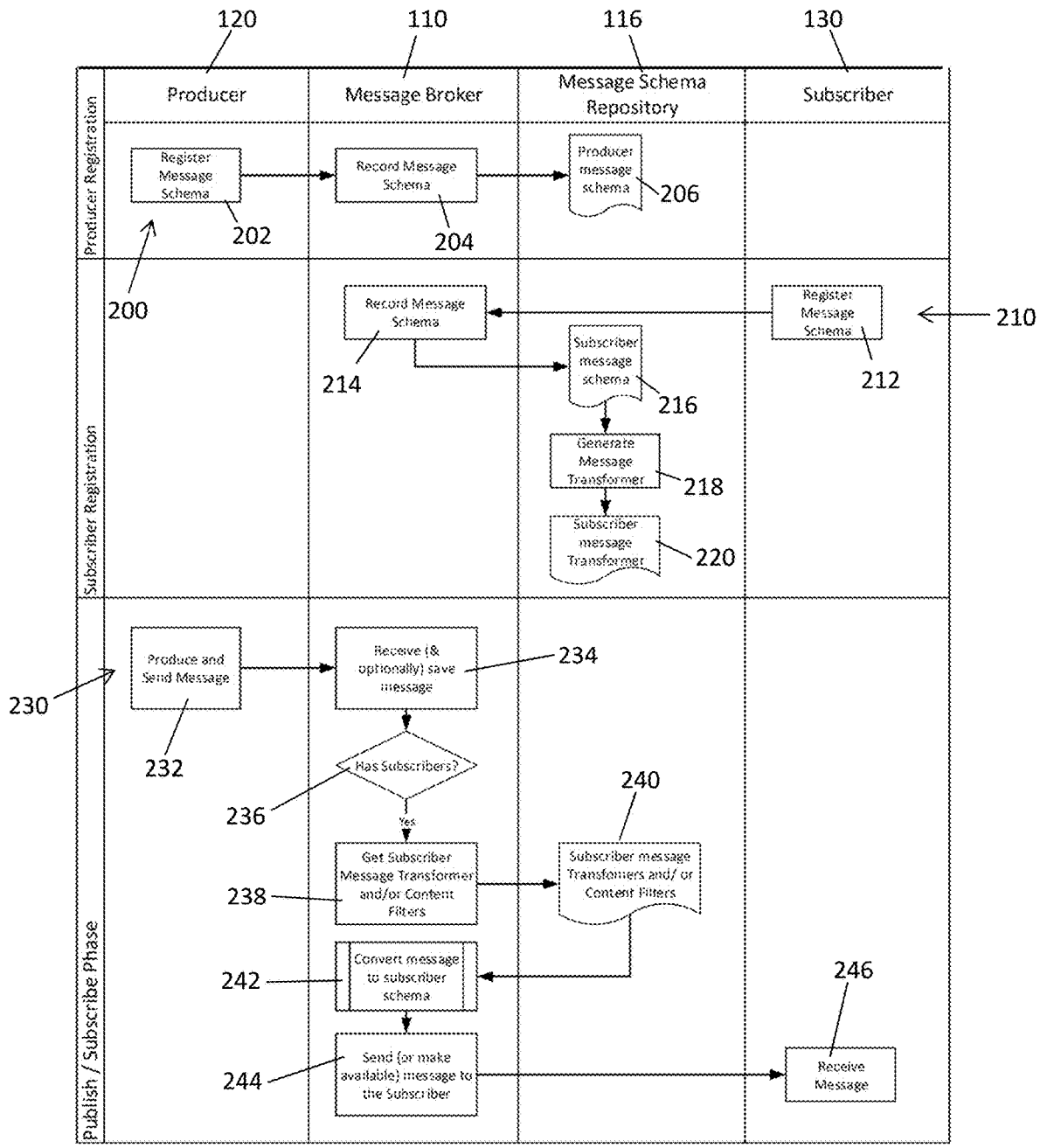
FIG. 2 is a flow diagram showing methods of message producer registration, message subscriber registration, and message publication according to embodiments of the present disclosure.

FIG. 2 is a flow diagram showing methods of message producer registration, message subscriber registration, and message publication according to embodiments of the present disclosure.

FIG. 2 shows a method 200 of message producer registration according to an embodiment of the present disclosure. In step 202, the message producer 120 registers a producer message schema with the message broker server 110. The producer message schema 206 defines the message structure, for example the data fields, with which the message producer terminal 120 will generate messages. In step 204, the message broker server 110 stores the producer message schema 206 in the message schema repository 116.

FIG. 2 also shows a method 210 of message subscriber registration according to an embodiment of the present disclosure. In step 212, the message subscriber terminal 130 registers a subscriber message schema with the message broker server 110. The subscriber message schema defines the message structure, for example the data fields, in which the message subscriber terminal 130 has an interest. The subscriber message schema indicates a set of message fields which is a subset of the message fields indicated by the producer message schema. In step 214, the message broker server 110 stores the subscriber message schema 216 in the message schema repository 116. In step 218, the message schema repository 116 generates a subscriber message transformer 220 which is stored in the message schema repository 116. When the subscriber message schema indicates a subset of the data fields of the producer message schema, the subscriber message transform may indicate which of the data fields of the producer message schema are also data fields in the subscriber message schema.

FIG. 2 also shows a method 230 of processing messages according to an embodiment of the present disclosure. In step 232, the message producer terminal 120 produces a message and sends the message to the message broker server 110. In step 234, the message broker server 110 receives the message. In some embodiments, the message broker server 110 also saves the message in step 234. In step 236, the message broker server 110 determines if the message producer 120 has subscribers that have registered to receive messages from the message producer terminal 120. If the message producer 120 has subscribers, the method moves to step 238. In step 238, the message broker server 110 retrieves a subscriber message transformer and/or content filter 240 for the subscriber from the message schema repository 116. In step 242, the message broker server 110 transforms the producer message to a subscriber message by applying the subscriber message transformer and/or content filter 240. In step 244, the message broker server 110 sends or makes available the subscriber message to the subscriber terminal 130. In step 246, the message subscriber terminal 130 receives the subscriber message.

It is envisaged that the data fields of the subscriber message schema may not be a subset of the data fields of the producer message schema. In such situations, the administrator 118 may edit the subscriber message transformer or create a custom message transformer for use as the subscriber message transformer as described below with reference to FIG. 3.

Figure 3:
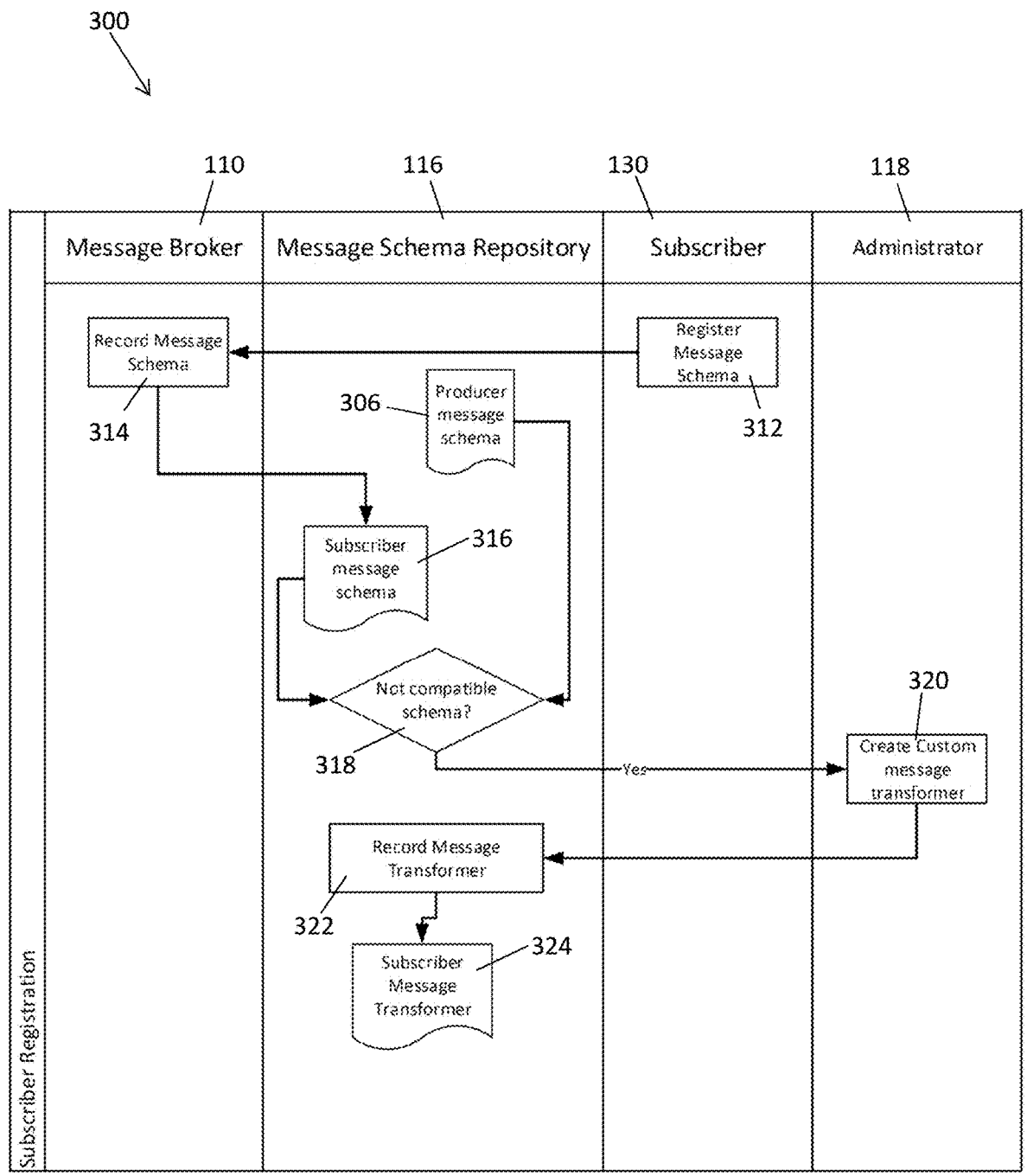
FIG. 3 shows a method of subscriber registration according to an embodiment of the present disclosure.

FIG. 3 shows a method of subscriber registration according to an embodiment of the present disclosure. The method 300 shown in FIG. 3 may take the place of the method 210 shown in FIG. 2 when subscriber message schema is not compatible with the producer message schema, for example, when the data fields of the subscriber message schema are not a subset of the data fields of the producer message schema.

Examples of situations when the subscriber message schema is not compatible with the producer message schema are as follows.

In some embodiments, the subscriber message data field may be generated by combining two or more data fields of the producer schema. For example, the subscriber message schema may include a data field of a person's full name. This data field may be made up of separate data fields for person's title, first name, middle name, and family name in the producer schema.

Another example is the date of birth may be represented as "DDMMYYYY" (e.g. 06032017 for 6 Mar. 2017) in the producer schema, but expected to be "YYYYMMDD" (i.e. 20170306) in the subscriber schema OR even only "MMDD" (i.e. 0306) in the subscriber schema.

A further example is that gender information may be specified as "Male" and "Female" in producer schema but required to be "1", "2" etc. in the subscriber schema.

A different kind of example is a structural transformation. For example the message producer represents person as {firstName, lastName, gender, age, street, city, country} but subscriber needs it in form of {name {firstName, lastName} gender, age, address {street, city, country}}, or vice-versa.

Message transformations can be a structure transformation as well as a data element translation (for example Male=>1, Female=>2).

In step 312, the message subscriber terminal 130 registers a subscriber message schema with the message broker server 110. The subscriber message schema defines the message structure, for example the data fields, in which the message subscriber terminal 130 has an interest. The subscriber message schema indicates a set of message fields which is a subset of the message fields indicated by the producer message schema. In step 314, the message broker server 110 stores the subscriber message schema 316 in the message schema repository 116. In step 318, the message schema repository 116 compares the subscriber message schema 316 with a stored producer message schema 306 to determine if the message schema are compatible. This comparison may include determining if the data fields of the subscriber message schema 316 are a subset of the data fields of the producer message schema 306. The producer message schema 306 stored in the message schema repository 116 may have been registered with the message broker server 110 using the method 200 described above in relation to FIG. 2.

If it is determined in step 318 that the subscriber message schema 316 and the producer message schema 306 are compatible, then the method continues to step 218 described above in relation to FIG. 2. If it is determined in step 318 that the subscriber message schema 316 and the producer message schema 306 are not compatible, then in step 320, the administrator 118 is prompted to create a custom message transformer. In step 320, the administrator 118 creates the custom message transformer.

The custom message transformation may take the form of XSLT (Extensible Stylesheet Language Transformations) or similar transformation. It may also take a form of specialized programming code that digests input format and generate output format.

In the example of the person schema discussed above, a custom message transformer entered by the administrator 118 may take the following form:

```
ReceiverPerson =
{
name: FirstName(ProducerPerson) + LastName(ProducerPerson),
gender: Gender(ProducerPerson),
age: Age(ProducerPerson),
```

-continued

```
address: Street (ProducerPerson) + City
(ProducerPerson) +
Country(ProducerPerson)
}
```

In the above example, ReceiverPerson is a subscriber message schema ProducerPerson is a producer message schema. The producer message schema has the fields First-Name, LastName, Gender, Age, Street, City, and Country. The subscriber message schema has the message fields name, gender, age, and address.

In step 322, the message schema repository records the custom message transformer and stores the custom message transformer as the subscriber message transformer 324.

In some embodiments, the message schema repository 116 may be operable to identify certain data fields as sensitive information, and prompt the administrator 118 generate a custom message filter. An example of such an embodiment is described below with reference to FIG. 4.

Figure 4:
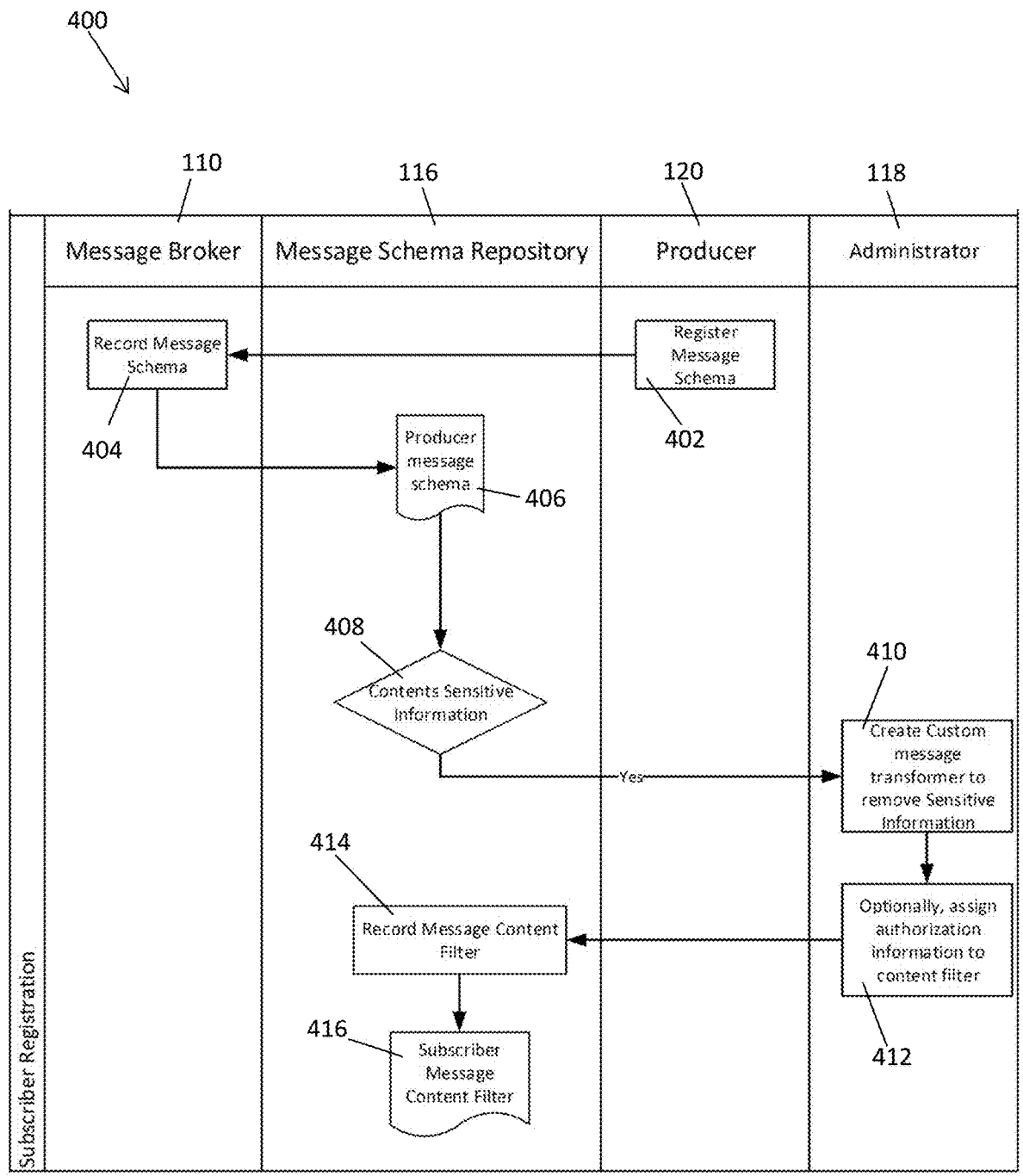
FIG. 4 shows a method of generating a message filter according to an embodiment of the present disclosure.

FIG. 4 shows a method 400 of generating a message filter according to an embodiment of the present disclosure.

In step 402, the message producer terminal 120 registers a producer message schema with the message broker server 110. The producer message schema 406 defines the message structure, for example the data fields, with which the message producer terminal 120 will generate messages. In step 404, the message broker server 110 stores the producer message schema 406 in the message schema repository 116.

In step 408, the message schema repository 116 determines whether the producer message schema contains sensitive information 408. The determination in step 408 may be made by the authentication and authorization system 114 shown in FIG. 1. The identification of sensitive information may be made using the fields included in the producer message schema 406.

In some embodiments, information that could be used to identify personal information such as names and addresses may be identified in step 408 as sensitive information. In other embodiments, information such as payment card numbers and expiry dates may be identified as sensitive information. The schema repository 116 may store indications of fields considered to be sensitive, alternatively these indications may be stored in the authentication and authorization system 114.

If in step 408, the producer message schema 406 is identified as containing sensitive information, the producer message schema is sent to an administrator 118. In step 410, the administrator 118 creates a custom message transformer to remove sensitive information. In some embodiments, the custom message transformer may anonymize the data fields identified as sensitive information, for example by replacing the data fields with data that allows data corresponding to unique individuals to be identified but hides the identity of those individuals. In other embodiments, the custom message transformer may prevent certain data fields from being included in message provided to subscribers.

In step 412, authorization information may be assigned to the content filter. This may allow certain data fields to be accessed by some subscribers, for example those having an authorization, but not allowing other subscribers to access those data fields.

In step 414, the message schema repository records the content filter as a subscriber message content filter 416.

In some embodiments, the method 400 above may be applied to the subscriber message schema, for example by the authentication and authorization system 114, the rules for determining which fields are to be provided to the subscriber may be stored in the schema repository 116.

Figure 5:
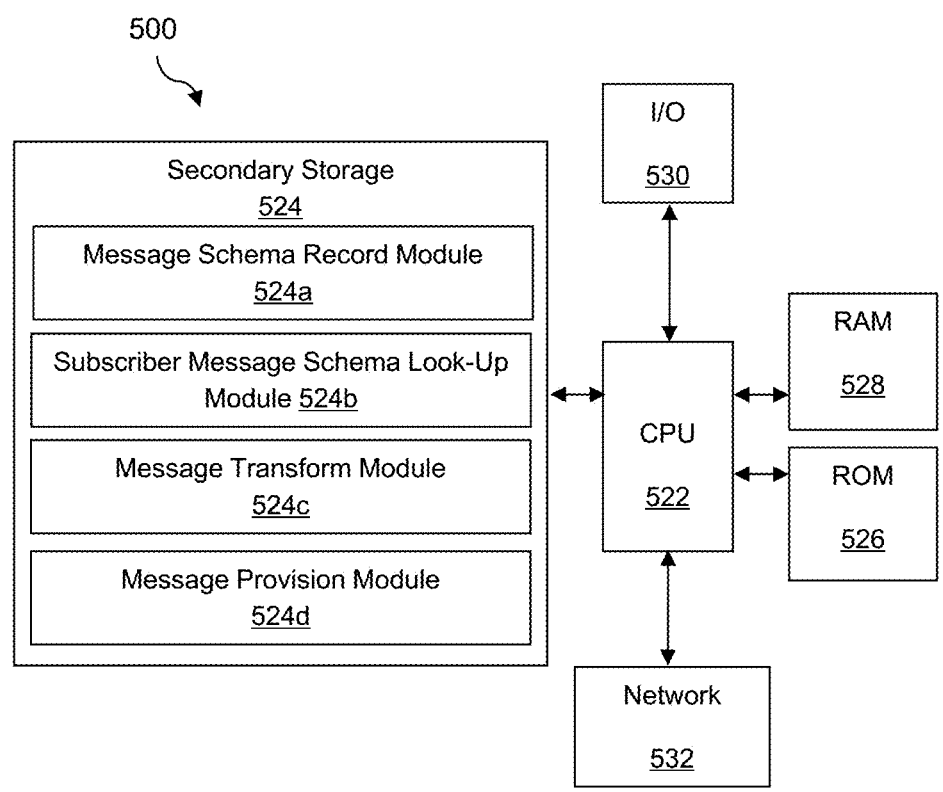
FIG. 5 is a block diagram illustrating a technical architecture of a message broker server according to an embodiment of the present disclosure.

FIG. 5 is a block diagram showing a technical architecture 500 of the message broker server 110 for performing steps of exemplary methods 200, 210, 230, 300, and 400, which are described above with reference to FIGS. 2, 3, and 4. Typically, the methods 200, 210, 230, 300, and 400 are implemented by a number of computers each having a data-processing unit. The block diagram as shown in FIG. 5 illustrates a technical architecture 500 of a computer which is suitable for implementing one or more embodiments herein.

The technical architecture 500 includes a processor 522 (which may be referred to as a central processor unit or CPU) that is in communication with memory devices including secondary storage 524 (such as disk drives), read only memory (ROM) 526, and random access memory (RAM) 528. The processor 522 may be implemented as one or more CPU chips. The technical architecture 500 may further include input/output (I/O) devices 530, and network connectivity devices 532.

The secondary storage 524 typically includes one or more disk drives or tape drives and is used for non-volatile storage of data and as an over-flow data storage device if RAM 528 is not large enough to hold all working data. Secondary storage 524 may be used to store programs which are loaded into RAM 528 when such programs are selected for execution. In this embodiment, the secondary storage 524 has a message schema record module 524a, a subscriber message schema look-up module 524b, a message transform module 524c, and message provision module 524d including non-transitory instructions operative by the processor 522 to perform various operations of the method of the present disclosure. As depicted in FIG. 5, the modules 524a-524d are distinct modules which perform respective functions implemented by the message broker server 110. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 524a-524d is described herein, these may alternatively be implemented as one or more hardware modules (such as field-programmable gate array(s) or application-specific integrated circuit(s)) including circuitry which implements equivalent functionality to that implemented in software. The ROM 526 is used to store instructions and perhaps data which are read during program execution. The secondary storage 524, the RAM 528, and/or the ROM 526 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 532 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 532 may enable the processor 522 to communicate with the Internet or one or more intranets. With such a network connection, it is contemplated that the processor 522 might receive information from the network, or might output information to the network in the course of performing the above-described method operations. Such information, which is often represented as a sequence of instructions to be executed using processor 522, may be received from and outputted to the network, for example, in the form of a computer data signal embodied in a carrier wave.

The processor 522 executes instructions, codes, computer programs, scripts which it accesses from hard disk, floppy disk, optical disk (these various disk based systems may all be considered secondary storage 524), flash drive, ROM 526, RAM 528, or the network connectivity devices 532. While only one processor 522 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 500, at least one of the CPU 522, the RAM 528, and the ROM 526 are changed, transforming the technical architecture 500 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 500 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 500 to provide the functionality of a number of servers that is not directly bound to the number of computers in the technical architecture 500. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

In an example embodiment, the message producer terminal 120 may produce messages containing of people, the data may include fields such as first name, last name, suffix, initial, age, and gender. The producer message schema may define these data fields. The subscriber may request to receive data corresponding to the full name of each person. In such as case, the transform applied by the message broker may combine the first name field and the last name field to produce a full name field. This transform may be input according to an administrator according to the method described above in relation to FIG. 3.

In the example embodiment described above, certain fields such as the age and gender of the people may be indicated as sensitive by the authentication and authorization system 114. This the content subscriber message content filter described above with reference to FIG. 4 may be applied to remove this data.

In some embodiments, the subscriber message content filter may filter according to the value of certain message fields. In the example described above, the subscriber message filter may filter out records based on the age of the people, for example by removing data corresponding to people under the age of 18 y ears.

In another example, the message producer terminal may produce messages relating to payment transactions made by payment cards. The message subscriber terminal may relate to an entity that performs statistical analysis on the payment transaction data. The systems described above allow this data to be filtered by the message broker, for example to remove certain data fields that contain sensitive information such as credit card numbers and expiry dates. The message broker server may also operate to filter out certain transaction records such as transactions made by people under the age of 18 years. Alternatively since transaction records such as those carried out by children may be subjected to a higher data protection standard with more data removed or anonymized.

Whilst the foregoing description has described exemplary embodiments, it will be understood by those skilled in the art that many variations of the embodiment can be made within the scope and spirit of the present disclosure.

What is claimed is:

1. An apparatus for processing messages, the apparatus comprising:
    a computer processor and a data storage device, the data storage device having a message transform module and a message provision module comprising non-transitory instructions executable by the processor to:
    receive a producer message from a message producer, the producer message structured according to a producer message schema, the producer message schema defining a plurality of producer message fields;
    transform the producer message to obtain a subscriber message, wherein transforming the producer message comprises applying a subscriber message transform comprising a set of rules for converting a message from the producer message schema to a subscriber message schema associated with a message subscriber, the subscriber message schema defining a plurality of subscriber message fields, wherein the set of rules populates each of the subscriber message fields with at least one value extracted from a corresponding at least one of the producer message fields, wherein the plurality of subscriber message fields differs from the plurality of producer message fields; and
    provide the subscriber message to the message subscriber.

2. An apparatus according to claim 1, wherein the plurality of subscriber message fields defined by the subscriber message schema is a subset of the plurality of producer message fields defined by the producer message schema.

3. An apparatus according to claim 2, wherein the rules of the subscriber message transform are determined according to a subscriber selection of message fields.

4. An apparatus according to claim 1, wherein the subscriber message transform comprises a rule based on a value of a field of the producer message.

5. An apparatus according to claim 1, wherein the message transform module further comprises non-transitory instructions executable by the processor to transform the producer message by applying a content filter to the producer message.

6. An apparatus according to claim 5, wherein the content filter comprises a rule based on a value of a producer message field of the producer message.

7. An apparatus according to claim 5, wherein the content filter is configured according to an authorized message schema which defines a set of message fields which the subscriber is authorized to access.

8. An apparatus according to claim 1, wherein the message provision module further comprises non-transitory instructions executable by the processor to provide the subscriber message to the message subscriber by sending the subscriber message to the message subscriber or allowing the message subscriber to access the subscriber message.

9. An apparatus according to claim 1, wherein the data storage device further comprises a message schema record module comprising non-transitory instructions executable by the processor to:
    at least one of receive a producer message schema from the message producer, and receive a subscriber message schema from the message subscriber; and
    store at least one of the producer message schema and the subscriber message schema in a schema repository.

10. An apparatus according to claim 1, wherein the data storage device further comprises a subscriber message schema look-up module comprising non-transitory instructions executable by the processor to look up the subscriber message schema in a schema repository.

11. A method performed by a message broker server for processing a message, the method comprising:
    receiving a producer message from a message producer, the producer message structured according to a producer message schema, the producer message schema defining a plurality of producer message fields;
    transforming the producer message to obtain a subscriber message, wherein transforming the producer message comprises applying a subscriber message transform comprising a set of rules for converting a message from the producer message schema to a subscriber message schema associated with a message subscriber, the subscriber message schema defining a plurality of subscriber message fields, wherein the set of rules populates each of the subscriber message fields with at least one value extracted from a corresponding at least one of the producer message fields, wherein the plurality of subscriber message fields differs from the plurality of producer message fields; and
    providing the subscriber message to the message subscriber.

12. A method according to claim 11, wherein the plurality of subscriber message fields defined by the subscriber message schema is a subset of the plurality of producer message fields defined by the producer message schema.

13. A method according to claim 12, wherein the rules of the subscriber message transform are determined according to a subscriber selection of message fields.

14. A method according to claim 11, wherein the subscriber message transform comprises a rule based on a value of a field of the producer message.

15. A method according to claim 11, wherein transforming the producer message further comprises applying a content filter to the producer message.

16. A method according to claim 15, wherein the content filter comprises a rule based on a value of a producer message field of the producer message.

17. A method according to claim 15, wherein the content filter is configured according to an authorized message schema which defines a set of message fields which the subscriber is authorized to access.

18. A method according to claim 11, wherein providing the subscriber message to the message subscriber comprises sending the subscriber message to the message subscriber or allowing the message subscriber to access the subscriber message.

19. A computer readable medium carrying computer executable instructions which, when executed on a processor, cause the processor to carry out a method according to claim 10.

* * * * *